June 9, 1931.  E. L. OLDHAM  1,808,817

ROCK DRILL

Filed March 8, 1928

INVENTOR.
E. L. Oldham
BY
ATTORNEY.

Patented June 9, 1931

1,808,817

UNITED STATES PATENT OFFICE

EDWARD L. OLDHAM, OF CLEVELAND, OHIO, ASSIGNOR TO THE CLEVELAND ROCK DRILL COMPANY, OF CLEVELAND, OHIO

ROCK DRILL

Application filed March 8, 1928. Serial No. 260,192.

The present invention is directed to improvements in rock drills.

The primary object of the invention is to provide novel means for preventing accidental rotation of the side bolt clamping nuts through the medium of the springs, which also serve to yieldably hold the front head of the drill upon the drill cylinder and constitute shock absorbers.

Another object of the invention is to provide a device of this character which is exceedingly simple in construction, durable, and efficient in performing its function as a shock absorber and nut lock.

Figure 1:
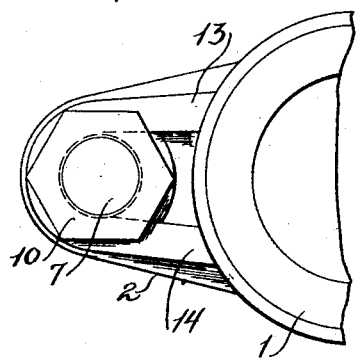
Figure 1 is a fragmentary top plan view.
Figure 3:
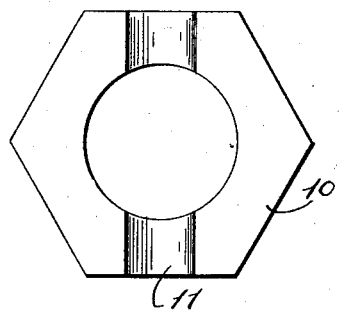
Figure 3 is a bottom plan view of one of the nuts.
Figure 2:
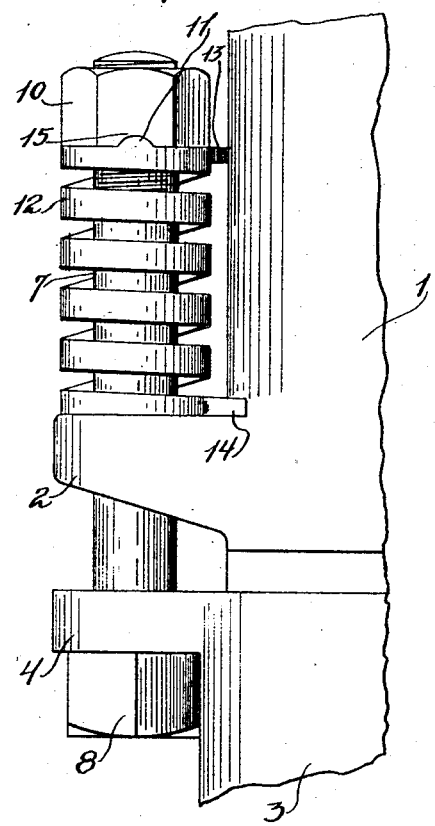
Figure 2 is a fragmentary side elevation.
Figure 4:
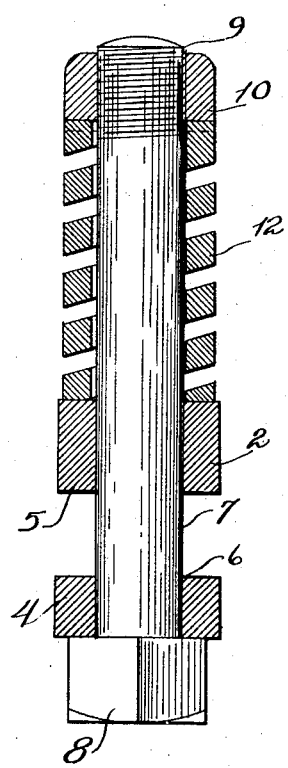
Figure 4 is a detail sectional view.

Referring to the drawings, 1 designates the front head of a drill, and 2 the laterally extending side flanges thereon, the drill cylinder 3 being likewise provided with corresponding flanges 4, and for which no claim is made per se. The side flanges, as customary, are provided with openings 5 and 6, respectively, for the reception of the side bolts 7, the heads 8 of which being of such size and shape as to have one of their faces rest against the cylinder to prevent rotation of the bolts when engaged in the openings of the flanges 2 and 4.

These bolts, as customary, are threaded, as at 9, for the reception of the nuts 10, each nut being provided with a radial recess 11, for the purpose of which will be later explained.

The coil shock absorbing springs 12 differ from the conventional spring in that they have the ends of their upper and lower terminals 13 and 14 extended somewhat beyond the vertical plane of the helices thereof in order that they will project in a direction to engage the sides of the front head 1.

As shown, the springs encircle the bolts 7 and are interposed between the flanges 2 and nuts 10, the uppermost helices of the springs being provided with projections 15 adapted to cooperate with the recesses 11 of the nuts and with which they yieldably engage for interlocking the springs and nuts.

Since the ends of the terminals 13 and 14 of the springs are capable of engaging the adjacent sides of the front head, the springs will be prevented from turning as the nuts are applied to the bolts, and owing to the interlocking engagement of the recesses 11 of the nuts and projections 15 of the springs the nuts will be held against accidental rotation, but can be conveniently removed when desired. Due to the fact that the bolts 7 are held against rotation when their heads are engaged with the drill cylinder a positive nut lock is provided for the shock absorbing springs, as will be obvious to those skilled in the art.

It will be of course obvious that the bolts 7 may be reversed, and in which case the heads thereof will engage the front heads, while the terminals of the springs will be in positions to engage the cylinder of the drill.

Having thus described the invention, I claim:

In a rock drill, an apertured flange, a bolt extended therethrough, a nut on the bolt and a helical spring disposed on the bolt between said flange and said nut, the ends of said spring being extended tangentially to abut against said drill in such a manner that any torque on said spring is taken in end thrust by said extended ends, and interlocking means on said spring and nut.

In testimony whereof I affix my signature.

EDWARD L. OLDHAM.